United States Patent [19]

Chappell

[11] 4,230,568

[45] Oct. 28, 1980

[54] TREATMENT OF HAZARDOUS WASTE

[75] Inventor: Christopher L. Chappell, Lichfield, England

[73] Assignee: Stablex A.G., Switzerland

[21] Appl. No.: 952,786

[22] Filed: Oct. 19, 1978

[30] Foreign Application Priority Data

Oct. 19, 1977 [GB] United Kingdom ............... 43507/77

[51] Int. Cl.$^2$ ............................................... C02C 5/02
[52] U.S. Cl. .................................................. 210/751
[58] Field of Search ..................................... 210/40, 59

[56] References Cited

U.S. PATENT DOCUMENTS

| | | | |
|---|---|---|---|
| 3,841,102 | 10/1974 | Cinner et al. | 210/59 X |
| 3,980,558 | 9/1976 | Thompson | 210/59 |
| 4,028,130 | 6/1977 | Webster et al. | 210/59 X |
| 4,069,148 | 1/1978 | Hutton et al. | 210/40X |

*Primary Examiner*—Thomas G. Wyse
*Attorney, Agent, or Firm*—Stevens, Davis, Miller & Mosher

[57] ABSTRACT

A process for treating organically contaminated liquid hazardous waste comprises adding to the waste Portland cement, fly ash and activated carbon.

9 Claims, No Drawings

TREATMENT OF HAZARDOUS WASTE

DESCRIPTION

The present invention concerns the treatment of hazardous waste produced by industry and commerce. It is an objective of the present invention to provide an improved process wherein liquid hazardous wastes, i.e. wastes in flowable form are converted to an impermeable solid.

British Pat. No. 1,485,625 provides a process for treating a liquid hazardous waste capable of being contained in an aqueous slurry which process comprises the steps of adding calcium-containing cement, preferably Portland cement powder and a powder consisting of aluminum silicate and/or an alumino-silicate, preferably fly ash, to the waste dissolved or dispersed in water thereby forming a flowable slurry containing the waste and allowing the slurry to set into a rigid rock like mass effectively a "synthetic rock".

The present invention is particularly concerned with the treatment of liquid wastes which contain significant amounts of organic substances. Such wastes fall into two main categories:

(1) Wastes which contain organic substances, such as phenols, which are water miscible. With these wastes using the process set out above the synthetic rock is well formed but the organic substances are more readily leached away than is desirable.

(2) Wastes which contain organic substances such as the halogenated olefins which are not readily miscible with water. These substances are neither fully contained in the slurry nor the synthetic rock.

Although as will hereinafter be explained what constitutes a "significant amount" has to be considered in terms of the leaching characteristics of the synthetic rock produced, typically an amount over 2% by weight would be regarded as significant.

In accordance with the present invention the ability of the slurry and the subsequently formed synthetic rock to incorporate wastes consisting of, or containing significant quantities of, organic substances is enhanced by the incorporation of a substantial amount of carbon, specifically powdered or granulated "active" carbon. What constitutes a "substantial" amount depends on the organic content in the waste. Typically however at least 0.5% and preferably about 1.0% or higher of carbon will be incorporated. The 0.5% and any subsequently mentioned percentage part is by weight unless otherwise specified.

By "incorporate" we mean to hold or "lock up" the organic waste in a manner such that any leaching out of the waste takes place at an acceptably slow rate in the environment.

Environmental acceptability is predicted by producing a leachate under the test conditions set out hereinafter which involves grinding the rock to a powder and digestion with distilled water. After the digestion the leachate is examined for organic contamination using one or more of the parameters Chemical Oxygen Demand (C.O.D.), 4 hr Permanganate Value (4 hr P.V.) and Biochemical Oxygen Demand (B.O.D.). These parameters and procedures for establishing them are known. For example they are described in a British Government publication "Analysis of Raw, Potable and Waste Waters", Her Majesty's Stationary Office, London 1972.

Typical acceptable values for leachates are a COD of 100 mg/l, a BOD of 50 mg/l, or a 4 hr P.V. of 20 mg/l. though these do not represent rigid threshold values. If one makes the assumption that one c.c. of aqueous waste weights approximately one gram these figures are equivalent to ppm. A leachate having a COD greatly in excess of 100 mg/l, a BOD greatly in excess of 50 mg/l or a P.V. greatly in excess of 20 mg/l would be regarded as indicative that the synthetic rock had not successfully locked up the organic waste. Alternatively expressed there should be a sufficient addition of active carbon to ensure that a leachate has COD, BOD and 4 hr P.V. at an acceptable level. It should be emphasised that what is an acceptable level will depend on the circumstances e.g. geological environment.

Although the incorporation capability can be enhanced by the inclusion of the carbon into the liquid waste we prefer to add the carbon with the solid ingredients of the slurry, i.e. the aluminium silicate or alumino-silicate and the calcium-containing cement.

The adjective "active" as applied to the carbon is used in its normal sense as characterising a carbon having a porous structure and a high surface area. The carbon may be inherently active or rendered so. One suitable active carbon is derived from anthracite. However other activated carbons such as wood or bone carbon may be effective. The most effective carbon for a particular waste can be determined experimentally.

One method in accordance with the invention involves the use of the so-called "high carbon" fly ash which is produced: (a) during the start up period of coal-fired power stations; (b) by power stations with low efficiency of burning their pulverised coal; or by oil-fired power stations wherein the oil contains 90–95% carbon. Such "high-carbon" fly ashes, which may be regarded as those containing more than 5% carbon have little commercial use and are therefore available at a low cost. Normal fly ashes usually contain approximately 1% of carbon. The carbon in fly ash is in the active form as the conditions under which it is generated steam and high pressure are activating conditions.

The following Examples describe in more detail methods in accordance with the present invention:

MATERIALS USED IN EXPERIMENTAL WORK

| | |
|---|---|
| Fly Ash 'Y' | This is a normal fly ash containing only 1% carbon. |
| Fly Ash 'Z' | This is a "high-carbon" fly ash containing 5.5% carbon. |
| Fly Ash 'W' | This is a "high-carbon" fly ash containing 12% carbon. |
| Waste 'A' | An organically contaminated water containing 250 ppm phenol, 1,000 ppm of total alcohols and trace organic components including pyridine and carbohydrates. The chemical analysis is: pH - 7.5 Chemical Oxygen Demand (COD) - 8,000 ppm 4hr. Permanganate Value (4hr.P.V.) - 2,100 ppm Biochemical Oxygen Demand (BOD) - 4,100 ppm (COD, 4hr. P.V. and BOD are standard methods for assessing degrees of organic contamination.) |
| Waste 'B' | Metal hydroxide filter cake containing iron hydroxide as a major contaminant and traces of other metal such as copper and |

|          |                                                                                                                                                                                                       |
|----------|-------------------------------------------------------------------------------------------------------------------------------------------------------------------------------------------------------|
|          | nickel. The waste does not contain any organic contamination.                                                                                                                                          |
| Waste 'C' | Phenolic lime sludge from a chemical manufacturer which contains 41% total dry solids at 105° C. and contains 1,100 ppm of phenol.                                                                     |
| Waste 'D' | This is a waste water reconditioning swill from a paper manufacturer containing general organic contamination and traces of chlorinated solvents including trichloroethylene and methylene chloride. |
| Waste 'E' | Is a calcium carbonate waste containing 90% dry solids and traces of manganese dioxide.                                                                                                                |
| Waste 'F' | A strong acidic waste containing 85% w/w sulphuric acid, 5% w/w nitric acid, used in a process for extracting essences and containing soluble organic pollutants and traces of organic solvents.       |
| Waste 'G' | A waste hydrated lime containing 30% calcium hydroxide and 70% water.                                                                                                                                  |
| Waste 'H' | A neutral (pH 8) aqueous waste from metal finishing containing approximately 1% total toxic heavy metals including cadmium, chromium, copper, lead, tin and zinc but not containing any organic pollutants. |
| Waste 'J' | A graphite sludge, slightly acidic in nature (pH 4).                                                                                                                                                   |
| Waste 'K' | A thick slurry from a tyre manufacturer containing organic and inorganic components and synthetic rubber.                                                                                              |
| Waste 'L' | A waste pharmaceutical product containing organic substances, zinc chloride and mercury.                                                                                                               |

EQUILIBRIUM LEACHING TEST 10 g of a rock-like product produced by adding a mixture of fly ash and Portland cement to a liquid hazardous waste are ground to a fine powder. Thereafter the ground product is mixed with 100 g of distilled water through which Carbon Dioxide has been bubbled (pH 4.5) at 20° C. for one hour in a 250 cc. vessel using a magnetic stirrer. The mixture is filtered through a Whatman No. 41 filter paper and the filtrate (leachate) is analysed for COD, BOD and 4 hr P.V. and if desired chemical constituents.

ACTIVATED CARBON

This is obtained from Thomas Ness Limited, P.O. Box 16, Wingerworth, Chesterfield. The two grades used are:
Powdered Activated Carbon CC100, and
Granular Activated Carbon CC818

EXAMPLE I 1,200 g of Waste 'A' is mixed with 800 g of Waste 'B' to form a uniform liquid dispersion containing organic contaminants. To this dispersion added as dry ingredients activated carbon (Xg, either powdered or granular) and 550 g of fly ash (either 'Y' or 'Z')+110 g of ordinary Portland cement, and the mixture stirred until it is homogeneous but flowable slurry. The slurry set into a hard synthetic rock within three days and was leached by the Equilibrium Leaching Test after ten days.

When fly ash 'Y' was used and X=0 the leachate had the following analysis: (the percentage of carbon in the system is 0.20%)

| COD      | 300 ppm |
|----------|---------|
| Phenol   | 9 ppm   |
| 4 hr. P.V. | 75 ppm  |
| BOD      | 150 ppm |

When fly ash 'Z' was used and X=0 (the percentage of carbon in the system is 1.1%)

| COD      | 100 ppm |
|----------|---------|
| Phenol   | 1.5 ppm |
| 4 hr. P.V. | 25 ppm  |
| BOD      | 48 ppm  |

When fly ash 'Y' was used and X=20 g (the percentage of carbon in the system is 0.95%)

| COD      | 80 ppm |
|----------|--------|
| Phenol   | 2 ppm  |
| 4 hr. P.V. | 20 ppm |
| BOD      | 44 ppm |

In this case the fly ash was mixed with the activated carbon and the fly ash, activated carbon and cement were added at the same time.

EXAMPLE II 1,000 g of waste 'C' was mixed with 220 g of fly ash (either 'Y' or 'Z' and 110 g of Ordinary Portland cement and Xg activated carbon. When X=0 and fly ash 'Y' was used i.e. when the carbon content was 0.16%, the leachate contained 30 ppm phenol and when fly ash 'Z' was used i.e. when the carbon content was 0.90% the leachate contained 6 ppm phenol.

When fly ash 'Y' was used and X=10 g i.e. when the carbon content was 0.91%, the leachate contained 4 ppm phenol. In this case the fly ash was mixed with the activated carbon and they were added together.

EXAMPLE III 1,000 g of waste 'D' was mixed with 1,000 g of Waste 'E' to form a homogenous composition. To this was added 500 g of fly ash, whether 'Y' or 'Z',+166 g of ordinary Portland cement and Xg of activated carbon.

When X=0 and the fly ash is 'Y' i.e. when the carbon content was 0.18% the leachate had a COD of 260 ppm and 4 hr P.V. of 95 ppm.

When X=0 and the fly ash is 'Z' i.e. when the carbon content was 1.0% the leachate had a COD of 100 ppm and 4 hr P.V. of 15 ppm.

When fly ash 'Y' was used and X=10 i.e. when the carbon content was 0.56%, COD was 90 ppm and 4 hr P.V. was 10 ppm on the leachate. In this case the fly ash and activated carbon were pre-mixed before the addition with the ordinary Portland cement and the mixture of 'D' and 'E'.

When the activated carbon is added before either the fly ash or cement, the leachate had a COD of 180 ppm and 4 hr. P.V. of 65 ppm.

EXAMPLES IV 620 g of waste 'H' was mixed with 300 g of waste 'G' to which 100 g of waste 'F' was added. 220 g of fly ash (either 'Y' or 'W'), 110 g of ordinary Portland cement and Xg of activated carbon were mixed in. Hard synthetic rock was obtained in three days. The hard synthetic rock was subjected to the equilibrium leaching test after ten days.

The 4 hr. P.V. of the leachate was determined and the following results obtained:

| Fly Ash | X = | Carbon content of system | 4 hr. P.V. |
|---|---|---|---|
| 'Y' | 0 | .16% | 525 mg/l |
| 'W' | 0 | 2.0% | 5 mg/l |
| 'Y' | 20 | 1.50% | 19.5 mg/l |

EXAMPLE V 500 g of waste 'J' was mixed with 50 g of waste 'G' and 300 g of waste 'E'. To this mixture was added 250 g of fly ash 'Y' and 50 g of ordinary Portland cement and Xg of activated carbon. A synthetic rock was obtained after four days and the synthetic rock was subjected to an equilibrium leaching test after ten days and the 4 hr. P.V. of the leachate was determined. It was found that when X=0, i.e. when the carbon content of the system was 0.21% the 4 hr. P.V. was 56 mg/l and when X=10 i.e. when the carbon content of the system was 1.1% the 4 hr. P.V. was 36 mg/l.

EXAMPLE VI 500 g of waste 'K' was mixed with 110 g of fly ash ('Y' or 'Z') and 55 g of ordinary Portland cement. This produced a hard synthetic rock in three days and the synthetic rock was subjected to an equilibrium leaching test for ten days. When fly ash 'Y' was used i.e. when the carbon content of the system was 0.16% the 4 hr. P.V. of the leachate was 38 mg/l, when fly ash 'Z' was used i.e. when the carbon content of the system was 2.0% the 4 hr. P.V. of the leachate was 18 mg/l.

EXAMPLE VII 1,000 g of waste 'L' was mixed with 800 g of waste 'E' and Xg of activated carbon. 400 g of fly ash 'Y' and 250 g of ordinary Portland cement were added. A solid synthetic rock was obtained after three days and this rock was subjected to an equilibrium leaching test after ten days. When X=0 i.e. when the carbon content of the system was 0.16% the 4 hr. P.V. was found to be 85 mg/l for the leachate and when X=100 i.e. when the carbon content of the system was 4.2% the 4 hr. P.V. of the leachate was 6 mg/l. Less than 0.1 ppm of zinc and less than 0.05 ppm of mercury was found in the leachate.

I claim:

1. A method of treating a liquid hazardous waste which may contain a significant proportion of an organic contaminant such method comprising the steps of adding to the liquid waste calcium-containing cement and an aluminium silicate or an alumino-silicate thereby forming a flowable slurry and thereafter allowing the slurry to set into a rigid rock-like mass and adding to the slurry an amount of active carbon sufficient to reduce to an acceptable level the leaching of the waste from the rock-like mass.

2. A method as claimed in claim 1 wherein the slurry contains more than 0.5% of carbon.

3. A method as claimed in claim 1 wherein the slurry contains approximately 1% or more of carbon.

4. A method as claimed in claim 1, 2, or 3 wherein the waste contains more than 2% of organic contaminant.

5. A method as claimed in claim 4 wherein the active carbon is mixed with the cement/silicate mixture.

6. A method as claimed in claim 1, 2, or 3 wherein the active carbon is added with the cement/silicate mixture.

7. A method as claimed in claim 6 wherein the said mixture is a fly ash containing more than 5% carbon.

8. A method as claimed in claim 6 wherein the active carbon is derived from anthracite.

9. A method of inhibiting leaching of a hazardous liquid waste material from a rock-like mass in which the hazardous waste has been entrapped by a process comprising (1) mixing with a liquid containing said waste material
 (a) a cement which contains calcium, and
 (b) an aluminum silicate or alumino-silicate thereby forming a flowable slurry, and thereafter (2) allowing the slurry to set into a rigid rock-like mass, said method comprising mixing active carbon with said flowable slurry prior to setting thereof into said rock-like mass to reduce the leaching of the waste material from the resulting rock-like mass.

* * * * *